May 27, 1969 P. M. SPENCE Re. 26,584

SEPARABLE FASTENER

Original Filed Sept. 23, 1963

INVENTOR
PETER MARVIN SPENCE
BY Maybee & Legris
ATTORNEYS

United States Patent Office

Re. 26,584
Reissued May 27, 1969

26,584

SEPARABLE FASTENER

Peter Marvin Spence, 328 Main St., Markham, Ontario, Canada

Original No. 3,195,202, dated July 20, 1965, Ser. No. 310,546, Sept. 23, 1963. Application for reissue July 14, 1967, Ser. No. 661,145

Int. Cl. A44b *11/00*

U.S. Cl. 24—230 10 Claims

Matter enclosed in heavy brackets [ ] appears in the original patent but forms no part of this reissue specification; matter printed in italics indicates the additions made by reissue.

*ABSTRACT OF THE DISCLOSURE*

*A buckle including a pair of end members, one for attachment to each end of a bracelet. The first end member includes a slide member that is insertable into the second end member and can be releasably locked thereto by a latch in the second end member. The second end member contains a retractor to which is attached one end of a flexible strand, the other end of the strand being secured to the slide member. The strand extends through an aperture in the latch and is adapted to bias the latch transversely of the strand into latching engagement with the slide member.*

This invention relates to a buckle for bracelets and in particular to a buckle having a retractable "safety chain" that can be used with wristwatch bracelets, jewelry bracelets and the like.

*In the past buckles for use with conventional bracelets, e.g. for watches, have permitted the two ends of the bracelet to move completely apart when the buckle is unfastened. Therefore, when a user is placing a watch on his wrist, he must, with one hand, hold the watch and align and connect the two ends of the buckle, a task that can often be difficult. In the case of ladies' bracelets (of the kind having small buckles or clasps) safety chains are often provided to guard against accidental opening of the clasp. Such safety chains are not particularly attractive, although they are usually considered necessary to protect the bracelet or watch.*

*Accordingly, it is an object of the present invention to provide a buckle for either mens' or ladies' bracelets which is simple to use, reliable in operation, and which contains a safety chain that is concealed from view when it is in use.*

A buckle according to the invention includes a *pair of end members,* [housing that can be attached to one end of a bracelet and] *one for attachment to each end of the bracelet. One end member contains* a slide member that [can be attached to the other end of the bracelet. The slide member] is insertable into the *other end member* [housing] and can be releasably locked thereto *by a latch.* [The housing also contains a retractor to which is attached one end of a flexible strand, the other end of the strand being secured to the slide member. The] *A* flexible strand, *which* constitutes a "safety chain"[.], *extends between the end members and through an aperture in the latch. The strand is secured at one end member and is biased toward the other by a strand retractor so that the end members are biased toward each other.* [A feature of the invention is that the strand extends through an aperture in the latch and is adapted to bias] *The strand retractor may be positioned so that the strand biases* the latch transversely of the strand into latching engagement with the slide member.

[The object of the invention is to provide a buckle of simple and durable construction, which is reliable in operation, and which can easily be attached to a bracelet.]

The foregoing and still further objects and advantages of the invention will become apparent from a study of the following specification taken in conjunction with the accompanying drawings, in which like reference characters indicate corresponding parts throughout the several views, and in which.

Figure 1:
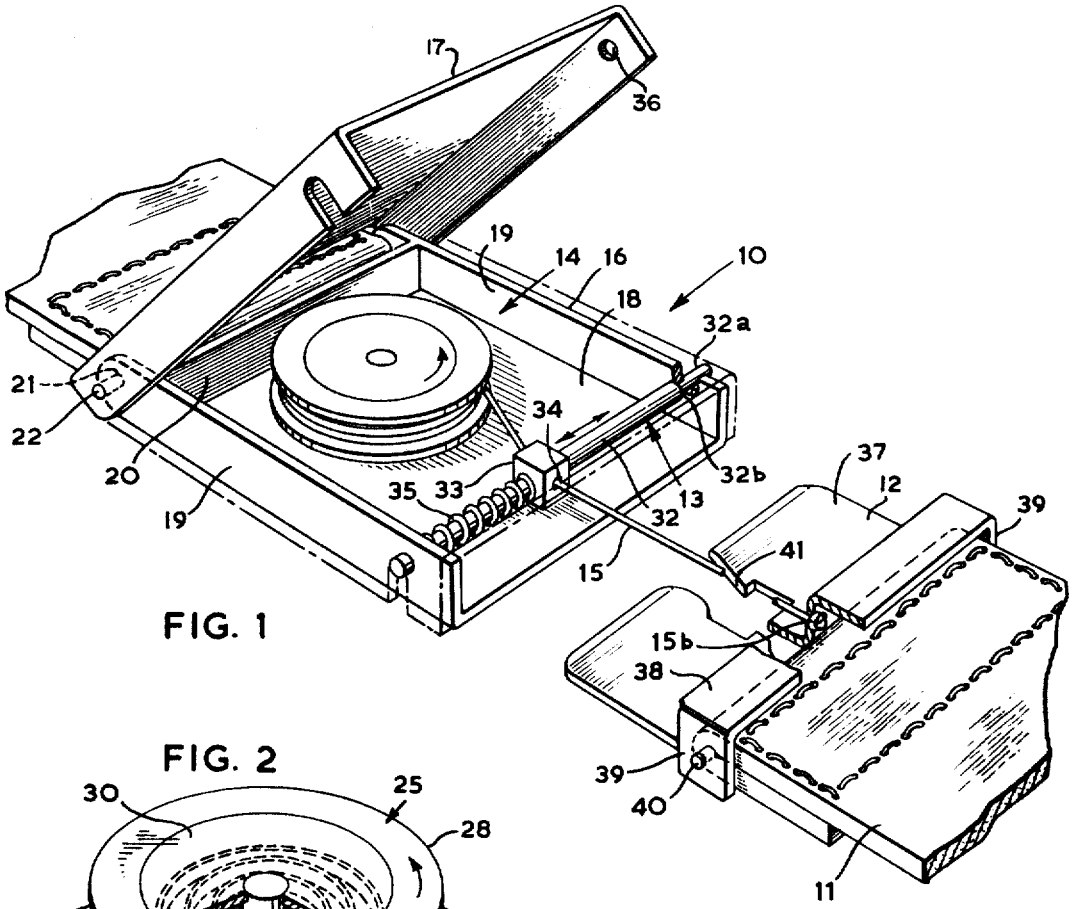
FIG. 1 is a perspective view of a buckle constructed in accordance with the invention, the buckle being in released or unlocked condition with its cover partly lifted away to reveal the internal construction.

Referring to the drawings, a buckle comprises a *first* [housing] *end member* 10 attached to one end of a bracelet 11, and *a second end member (not numbered) attached to the other end of the bracelet and containing* a slide member 12 [attached to its other end]. A latch 13 is provided in the [housing] *end member 10* for engaging the slide member when the latter is inserted into the [housing] *end member 10.* The [housing] *end member 10* also contains a retractor 14 to which is secured one end 15a of a flexible strand 15 which constitutes the flexible safety chain, the other end 15b of the strand being secured to the slide member.

The [housing] *end member* 10 comprises a channel-shaped frame 16 and a flanged cover 17 which fits snugly over the frame 16. The frame includes a web 18, opposed flanges 19 which constitute side walls, and a transverse flange 20 which extends between the flanges 19 adjacent one end of the frame; at its other end the frame is open. Two aligned circular openings 21 are provided near the ends of the flanges 19 which are adjacent the flange 20, for receiving the opposite ends of a conventional spring bar or push pin 22 of the type commonly used to [a] couple a bracelet to a wrist watch. The cover 17 is hinged at one end to the frame 16 by means of the free ends of the pin 22 which extend through aligned circular openings in the flanges of the cover.

The retractor 14 comprises a spindle 23 fast to the web 18 of the [housing] *end member* 10 by means of a screw 24, a drum 25 freely rotatable on the spindle, and a spiral spring 26 which biases the drum into strand-winding condition. The web 18 of the housing is dished upwardly around the foot of the spindle 23 to form a bearing surface for the drum.

Figure 2:
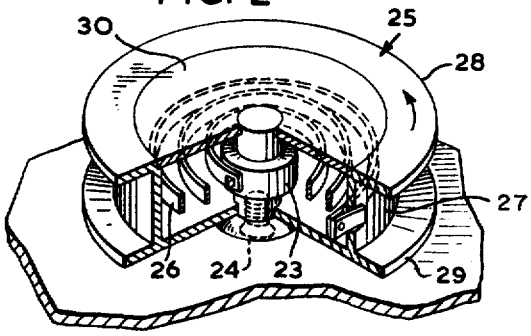
FIG. 2 is a perspective view, partly broken away, showing the retractor embodied in the buckle of FIG. 1.

The drum 25 is hollow, and in the form shown in FIG. 2 it includes a cylindrical wall 27 and circular flanges 28 and 29. Registering with a central opening in the flange 28 is a closure 30 which can be pried open to expose the interior of the drum.

The ends of the spiral spring 26 respectively are engaged in any conventional manner to the spindle 23 and to the cylindrical wall 27 of the drum in order that the drum may be biased into strand-winding condition, as mentioned previously. The spring illustrated in the drawings has been shown as being wound clockwise. It is obvious that a spring of opposite hand would be equally acceptable; the strand 15 would then be wound in the opposite direction around the drum, and the latch 13 would be reversed in operation. The end 15a of the strand is looped through three small closely spaced openings 31 provided in the cylindrical wall 27 of the drum and thus it is secured to the drum. The strand preferably is a nylon monofilament of about 25 pounds test for a buckle suitable for a man's bracelet, and of about 10 to 15 pounds test for a buckle suitable for a lady's bracelet.

The latch 13 comprises a cylindrical shaft 32 having an end 32a of reduced diameter which creates a shoulder 32b. Secured to the shaft at approximately its mid point is a lug 33 through which extends an aperture 34 which provides a guide for the strand 15. The ends of the shaft 32 are received in aligned circular openings provided in the opposed flanges 19 of the [housing] *end member 10,* and a helical spring 35 extending between the lug 33 and the more adjacent flange 19 urges the shaft axially in one sense, the movement of the shaft in that sense being limited by the engagement of its shoulder 32b with the other flange 19. Incidentally, the cover 17 may be locked in closed condition relative to the forms 16 by the registration and the engagement of the end 32a of the shaft 32 with an opening 36 provided in the adjacent side of the cover. It will be evident that the cover can be released by pushing axially the shaft 32 against the force of the spring 35, thus to disengage the end 32a of the shaft from the cover.

The slide member 12 comprises a blade 37 having a stepped portion 38 embodying opposed flanges 39. In these flanges are aligned openings which receive the ends of a conventional spring bar or push pin 40 whereby one end of the bracelet is coupled to the slide member. In the blade 37 is a hooked locking finger 41 adapted to engage the lug 33 of the latch 13.

Figure 3:
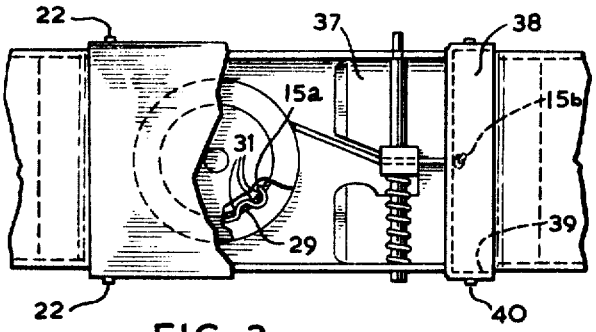
FIG. 3 is a plan view of the buckle in locked condition, with the cover partly broken away.

When the buckle is in locked condition, as illustrated in FIG. 3, the slide member 12 has been inserted in the [housing] *end member* 10, and the hooked locking finger 41 of the blade 37 is in locking engagement with the lug 33 of the latch member 13. The spiral spring 26 continually biases the drum 25 into strand-winding condition, and thus when the buckle is in locked condition the strand is fully wound around the drum. The strand 15 is always under tension, and consequently it assists the helical spring 35 to bias the latch into locking condition.

To release the latch, the end 32a of the shaft 32 is pushed axially, thus disengaging the lug 33 from the hooked locking finger 41; the slide member can then be withdrawn from the [housing] *end member 10.* As the slide member is withdrawn, the strand 15 unwinds from the drum against the force of the spiral spring 26.

With the slide member withdrawn from the housing *10* and the strand fully extended, the bracelet can easily be removed from the wrist of the wearer. To replace the bracelet the latch is released and the strand is extended; the bracelet then is slipped over the hand of the wearer and the slide member is inserted into the [housing] *end member 10,* a distinct "click" being [head] *heard* when the latch is engaged.

Figure 4:
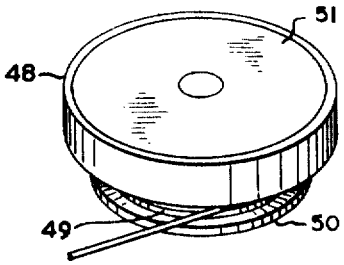
FIG. 4 is a perspective view of an alternative form of retractor.

An alternate form of retractor drum is illustrated in FIG. 4. This drum (generally indicated by reference numeral 51) comprises a first hollow cylinder 48 integral with and concentric with a second hollow cylinder 49 of smaller diameter than the first cylinder 48. The drum 51, is freely rotatable on a spindle and is provided with a spiral spring which biases it into strand-winding condition; these details are similar to those of the retractor 14 first described. The exterior of the drum 51, however, has a different configuration than that of the drum 25, i.e. the drum 51 has two concentric cylindrical portions of different diameter, namely the larger hollow cylinder 48 and the smaller hollow cylinder 49. The strand is wound around the smaller cylinder 49 and the spring and the mechanism associated with the spring (which is similar to that of the retractor 14) is located within the larger drum 48. The advantage of this construction is that the overall diameter of the drum 51 can be smaller than that of the drum 25, because the strand is wound around the small cylinder 49 and not around the portion of the drum which houses the spring. An annular flange 50 extends around the bottom edge of the cylinder 49 to prevent the strand from accidentally falling off the end of the drum.

It will be understood that the form of the invention herewith shown and described is a preferred example and that various modifications can be carried out without departing from the spirit of the invention or the scope of the appended claims.

What I claim as my invention is:

1. A buckle for a bracelet comprising *an end member* [a housing] for attachment to one end of the bracelet; a latch in the *end member* [housing] that is movable transversely of the *end member* [housing]; a slide member for attachment to the other end of the bracelet and adapted to be inserted into the *end member* [housing] for engagement by the latch; a flexible strand which is connected at one end to the slide member and which extends through an aperture in the latch and is adapted to bias the latch transversely of the strand into latching engagement with the slide member; and a strand retractor in the *end member* [housing] and connected to the opposite end of the strand for drawing the strand into the *end member* [housing].

2. A buckle as claimed in claim 1 wherein the latch comprises a shaft extending between two opposed side walls of the *end member* [housing], and a lug on the shaft that is adapted to engage the slide member to releasably lock it to the *end member* [housing], and wherein the said aperture is in the lug.

3. A buckle as claimed in claim 2 wherein the slide member includes a hooked locking finger that can be engaged by the latch.

4. A buckle as claimed in claim 2 wherein the shaft has an end which can be pushed axially against the tension of the strand to disengage the latch from the slide member.

5. A buckle for a bracelet comprising *an end member* [a housing] for attachment to one end of the bracelet; a latch in the *end member* [housing] that is movable transversely of the *end member* [housing]; a strand retractor comprising a spindle fast to the *end member* [housing], a drum freely rotatable on the spindle, and a spiral spring under tension within the drum and having one end anchored to the spindle and its other end secured to the drum; a slide member for attachment to the other end of the bracelet and adapted to be inserted into the *end member* [housing] for engagement by the latch; and a flexible strand which is connected at one end to the slide member and which extends through an aperture in the latch and is adapted to bias the latch transversely of the strand into latching engagement with the slide member, the opposite end of the strand being connected to the drum whereby the tension of the spiral spring continually biases the drum into strand-winding condition, whereby the strand is fully wound around the drum when the buckle is in locked condition.

6. A buckle as claimed in claim 5 wherein the slide member includes a hooked locking finger; wherein the latch comprises a shaft extending between two opposed side walls of the *end member* [housing], and a lug on the shaft adapted to engage the locking finger to releasably lock the slide member to the *end member* [housing]; and wherein the said aperture is in the lug.

7. A buckle as claimed in claim 5 wherein the drum comprises a first hollow cylinder integral with and concentric with a second hollow cylinder of smaller diameter than the first cylinder, wherein the spiral spring is located inside the first cylinder and wherein the strand is wound around the second cylinder.

*8. A buckle for a bracelet, said buckle comprising: first and second end members; said end members including means for attachment of said end members to respective ends of said bracelet; said first end member having a pair of holes in opposite sidewalls thereof and including a movable latch; said latch comprising a shaft extending between said sidewalls and extending through the holes therein, a lug fixed on said shaft and having an aperture therein, spring means biasing said shaft and lug axially toward one of said sidewalls, and means limiting move-*

*ment of said shaft and lug towards said one sidewall; said second end member including a slide member adapted to be inserted into said first for engagement by said latch, said slide member having a hooked locking finger engageable by said lug to lock said slide member to said first end member; a flexible strand extending between said end members and passing through said aperture in said lug; a strand retractor in one of said end members and connected to one end of said strand, said strand retractor including means biasing said strand to a retracted position; and means connecting the other end of said strand in the other of said end members against withdrawal therefrom, so that said strand retractor biases said end members toward each other.*

*9. A buckle according to claim 8 wherein said strand retractor includes a spindle fast to said one end member, a drum freely rotatable on said spindle, and a spiral spring under tension within said drum and having one end anchored to said spindle and its other end secured to said drum, the tension of said spiral spring continually biasing said drum into strand-winding condition, so that said strand is substantially fully wound around said drum when said buckle is in locked condition.*

*10. A buckle according to claim 9 wherein said drum comprises first and second hollow cylinders integral and concentric with each other, said second cylinder being*

*of smaller diameter than said first cylinder, said spiral spring being located within said first cylinder and said strand being wound around said second cylinder.*

References Cited

The following references, cited by the Examiner, are of record in the patented file of this patent or the original patent.

UNITED STATES PATENTS

| | | | |
|---|---|---|---|
| 1,101,049 | 6/1914 | Adamson. | |
| 1,537,213 | 5/1925 | Wylie. | |
| 1,622,954 | 3/1927 | Macheroux. | |
| 2,593,018 | 4/1952 | Fendrock. | |
| 18,245 | 9/1857 | Herman | 24—230 |
| 75,976 | 3/1868 | Reading | 24—230 |
| 953,597 | 3/1910 | Dains | 24—230 |
| 1,124,130 | 1/1915 | Grant | 24—1.4 |
| 1,739,676 | 12/1929 | Jones | 24—201.4 |
| 1,799,688 | 4/1931 | Jaffe | 24—1.4 |
| 2,417,168 | 3/1947 | Kalnitz | 24—230.1 |

FOREIGN PATENTS

| | | |
|---|---|---|
| 435,459 | 10/1911 | France. |

BERNARD A. GELAK, *Primary Examiner.*